No. 741,789. PATENTED OCT. 20, 1903.
A. M. HARRISON.
SHAFT CONNECTING DEVICE FOR CHANGE GEARS.
APPLICATION FILED JAN. 28, 1903.
NO MODEL.
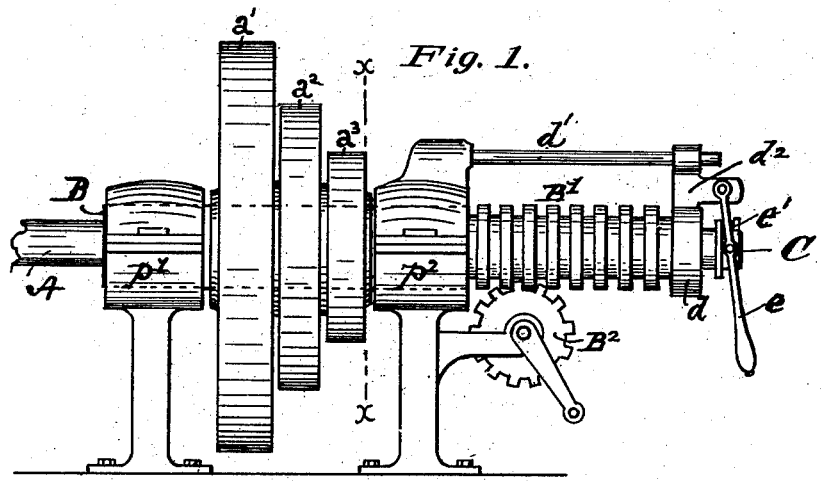
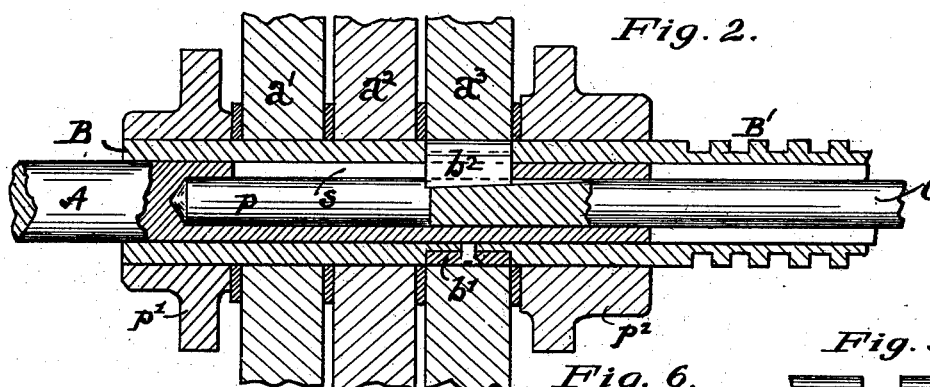
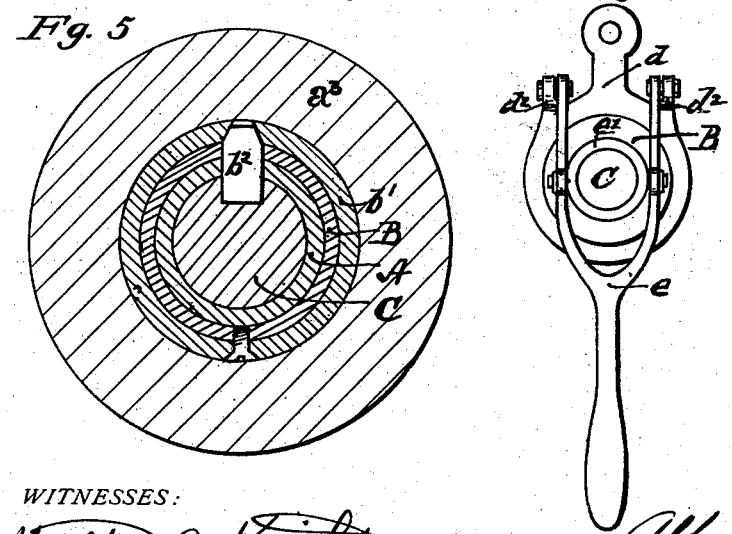
WITNESSES:
INVENTOR.
Alfred M. Harrison
BY
L. M. Hosea
ATTORNEY.

No. 741,789. Patented October 20, 1903.

UNITED STATES PATENT OFFICE.

ALFRED M. HARRISON, OF CINCINNATI, OHIO, ASSIGNOR TO THE KING MACHINE TOOL COMPANY, OF CINCINNATI, OHIO, A CORPORATION OF OHIO.

SHAFT-CONNECTING DEVICE FOR CHANGE-GEARS.

SPECIFICATION forming part of Letters Patent No. 741,789, dated October 20, 1903.

Application filed January 28, 1903. Serial No. 140,954. (No model.)

*To all whom it may concern:*

Be it known that I, ALFRED M. HARRISON, a citizen of the United States, residing at Cincinnati, in the county of Hamilton and State of Ohio, have invented new and useful Improvements in Shaft-Connecting Devices for Change-Gears, of which the following is a specification.

My invention relates to devices for engaging differential pulleys (in which term I include gears) to a driving or driven shaft, its object being to provide an improved construction of mechanism adjusting a friction-clutch device to any one of a series of loose differential pulleys selectively and operating the same to engage said gear or pulley to the shaft.

The invention applies to the class of devices in which a sleeve concentric with and longitudinally adjustable in relation to the shaft to any one of a series of adjacent gears or pulleys is employed to engage an expanding friction device within the bore of the pulleys; and my present improvement consists in placing the carrier upon instead of within the shaft and the pulleys on the carrier and employing a single friction-ring upon and adjustable with the carrier to each of the pulleys.

It consists also in the special means of adjusting the carrier and separating the expanding devicee.

The construction and operation of my improvement will be better understood in connection with the accompanying drawings, in which—

Figure 1 is a side elevation of the improvement as applied to a series of change-speed gears; Fig. 2, an axial section showing construction and relation of parts. Figs. 3 and 4 are similar partial side elevations of the carrier, showing the circumferential groove for the seating of the expansion-ring and the same with the ring seated therein, respectively; Fig. 5, a cross-section in the plane indicated by dotted line $x$ of Fig. 1, and Fig. 6 an end elevation at the right-hand end of Fig. 1.

Referring now to the drawings, A designates a driving or driven shaft, to or from which differential motion is to be communicated through loose pulleys or gears $a$, designated in series as $a'$ $a^2$ $a^3$. The shaft A rides in a sleeve B, whereby it is supported in pillow blocks or bearings $p'$ $p^2$, between which bearings the gears $a$ ride loosely on the sleeve B. The shaft A is fixedly held against longitudinal motion by means not shown; but the sleeve B is longitudinally adjustable in relation to the shaft through the bearings $p'$ $p^2$ by means presently to be described.

The sleeve B is circumferentially grooved at a convenient zone, as $b$, and carries in said groove a split expansion-ring $b'$, Figs. 3 and 4, exactly filling said groove flush with the periphery of the sleeve B, the function of which is when brought to the zone occupied by any one of the gears $a$ selectively by its expansion against the internal wall of the central perforation of the gear to thus temporarily unite the two in rotative connection through and by means of the expanding element. The expanding element is a rectangular block $b^2$, fitted to move radially in a corresponding perforation $s'$ in the sleeve B, opening through the bottom of the circumferential slot $b$ occupied by the expansion-ring $b'$ and also through longitudinal slot $s$ of corresponding width in the shaft A, the latter slot being extended to the full limit of adjustment of the sleeve B and inward into a corresponding axial perforation $p$ in the shaft A, continued through one end. The outer end of the block $b^2$ is wedge-shaped, so that when forced outward between the correspondingly-formed ends of the ring $b'$ the ring is expanded as described, and when the outward pressure upon the block is relieved the retracting force of the ring $b'$ forces the block inward to its normal position. Outward pressure is brought to bear upon the block $b^2$ by a mandrel C, fitted within the axial perforation $p$ of the shaft A and longitudinally adjustable therein. At the inner end the mandrel C has at one side an inclined longitudinal groove deepest at the extreme end and of a width to receive and retain the block $b^2$, whose lower side or base is oppositely inclined. The block $b^2$ by the construction and relation of parts as described serves the double function of a key, locking the sleeve B, shaft A, and mandrel C in constant rotative connection, while permitting free longitudinal adjustment of the sleeve B and also of the expanding wedge $b^2$ to force apart the contiguous ends of the split ring $b'$, and thus connect any one of the gears with the sleeve-shaft for rotation.

The mandrel C projects outward beyond the sleeve B and is there furnished with a rack-and-pinion connection, as follows: The outer portion of the sleeve B is grooved, as at B', into a series of circumferential rack-teeth fitted to engage the corresponding spur-pinion $B^2$, journaled in extensions of the bearing $p^2$, by whose rotation the sleeve B is moved longitudinally in relation to the shaft A. In the outer groove is carried a yoke-plate $d$, fitted to slide upon a rod $d'$, extended from the bearing $p^2$ and carrying projections $d^2$, to which is pivoted a bifurcated yoke-lever $e$, which in turn carries a yoke $e'$, embracing the grooved end of the mandrel C where it projects beyond the sleeve B.

Other parts incidental to the main construction will be referred to in connection with the following description of the mode of operation, which is as follows: Supposing neither of the gears $a$ to be rotatively connected, the sleeve B, carrying the expansion-ring $b'$ and the expanding block $b^2$, (out of operative engagement with the ring,) is moved by its pinion $B^2$ longitudinally to place the ring $b'$ within the zone of a given gear, as $a^3$, the position shown in Fig. 2. This adjustment being effected, the mandrel C is moved inward by the lever $e$ and the block $b^2$ is forced outward, spreading open the spring $b'$ and engaging the gear $a^3$ in rotative connection with the shaft A. When the mandrel C is again drawn outward, the retractile action of the ring $b'$ forces the block $b^2$ inward and the gear is disconnected, and the parts are ready for a new adjustment.

I claim as my invention and desire to secure by Letters Patent of the United States—

1. In a speed-changing device, the combination of a driving or driven shaft; a concentric sleeve longitudinally adjustable thereon; a plurality of gears or pulleys loose upon the sleeve; a split expansion-ring carried concentrically upon and by the sleeve; a tapered mandrel carried within the shaft; and a wedge-block extending radially outward from an inclined seat upon the tapered surface of the mandrel through radial slots of the shaft and sleeve between the terminals of the expansion-ring, substantially as and for the purpose set forth.

2. In a speed-changing device of the character indicated the combination with the shaft and loose pulleys thereon, and bearings for said shaft, of a sleeve adjustable on the shaft, said sleeve extending outward beyond the bearings and provided with circumferential grooves and intervening ribs constituting teeth, a split expansion-ring on the sleeve, means including a radially-movable wedge-block and means for actuating the same for expanding said ring, and a spur-pinion engaging the teeth of the sleeve to move said sleeve longitudinally upon the shaft while in motion substantially as and for the purpose set forth.

3. In a device of the character and for the purpose indicated the combination of the movable sleeve toothed as shown, the collar seated in the terminal groove, the guide-rod, said rod holding the sleeve against rotation, the concentric mandrel movable with the sleeve, and the controlling-lever pivoted to the collar and engaging the mandrel for independent adjustment, substantially as and for the purpose set forth.

In testimony whereof I have hereunto set my hand in presence of two subscribing witnesses.

ALFRED M. HARRISON.

Witnesses:
  WALTER A. KNIGHT,
  JOSEPH R. GARDNER.